United States Patent
Nelson et al.

(10) Patent No.: US 9,925,813 B2
(45) Date of Patent: Mar. 27, 2018

(54) LITHIUM INKS AND ELECTRODES AND BATTERIES MADE THEREFROM

(75) Inventors: Craig R. Nelson, Melbourne, FL (US); Glen C. Wensley, Rock Hill, SC (US); Wade W. Guindy, Henderson, NV (US)

(73) Assignee: BrightVolt, Inc., Redmond, WA (US)

( * ) Notice: Subject to any disclaimer, the term of this patent is extended or adjusted under 35 U.S.C. 154(b) by 0 days.

(21) Appl. No.: 13/614,351

(22) Filed: Sep. 13, 2012

(65) Prior Publication Data

US 2013/0011735 A1    Jan. 10, 2013

Related U.S. Application Data

(62) Division of application No. 13/111,184, filed on May 19, 2011, now Pat. No. 8,318,358, which is a division
(Continued)

(51) Int. Cl.
| | |
|---|---|
| *H01M 4/62* | (2006.01) |
| *B41M 3/00* | (2006.01) |
| *C09D 11/03* | (2014.01) |
| *C09D 11/30* | (2014.01) |
| *C09D 11/38* | (2014.01) |
| *H01M 4/12* | (2006.01) |

(Continued)

(52) U.S. Cl.
CPC ............. *B41M 3/006* (2013.01); *C09D 11/03* (2013.01); *C09D 11/30* (2013.01); *C09D 11/38* (2013.01); *H01M 4/12* (2013.01); *H01M 4/134* (2013.01); *H01M 4/38* (2013.01); *H01M 4/62* (2013.01)

(58) Field of Classification Search
CPC ...... H01M 4/583; H01M 4/587; H01M 4/134; H01M 4/38; H01M 4/62; H01M 4/12; H01M 4/64; Y02E 60/122; C09D 11/03; B41M 3/006
See application file for complete search history.

(56) References Cited

U.S. PATENT DOCUMENTS

| 4,474,858 A | 10/1984 | Makino et al. |
| 4,629,777 A | 12/1986 | Pfeifer et al. |

(Continued)

FOREIGN PATENT DOCUMENTS

WO    200221632    3/2002

OTHER PUBLICATIONS

Gabano, J.P. (Ed.), Lithium Batteries, Academic Press, London (1983).
(Continued)

*Primary Examiner* — Raymond Alejandro
(74) *Attorney, Agent, or Firm* — Maier & Maier, PLLC

(57) ABSTRACT

Lithium metal powder based inks are provided. The inks are provided in formulations suitable for printing using a variety of printing techniques, including screen printing, offset litho printing, gravure printing, flexographic printing, pad printing and inkjet printing. The inks include lithium metal powder, a polymer binder and optionally electrically conductive materials and/or lithium salts in a solvent. The inks are well suited for use in printing electrodes for use in lithium metal batteries. Batteries made from lithium powder based anodes and electronic applications such as RFID labels, Smart Cards and wearable medical devices are also provided.

16 Claims, 6 Drawing Sheets

Related U.S. Application Data of application No. 11/061,751, filed on Feb. 18, 2005, now Pat. No. 7,968,233.

(60) Provisional application No. 60/545,179, filed on Feb. 18, 2004.

(51) Int. Cl.
H01M 4/134 (2010.01)
H01M 4/38 (2006.01)

(56) References Cited

U.S. PATENT DOCUMENTS

| | | | |
|---|---|---|---|
| 4,994,110 A | 2/1991 | Stoffel et al. | |
| 5,324,333 A * | 6/1994 | Doniat et al. | 29/623.5 |
| 5,567,474 A | 10/1996 | Dover et al. | |
| 5,776,369 A | 7/1998 | Dover et al. | |
| 5,888,672 A | 3/1999 | Gustafson | |
| 5,976,403 A | 11/1999 | Dover et al. | |
| 6,046,268 A | 4/2000 | Ochoa et al. | |
| 6,168,885 B1 | 1/2001 | Narang | |
| 6,174,627 B1 | 1/2001 | Ohta | |
| 6,210,831 B1 | 4/2001 | Gorkovenko et al. | |
| 6,265,107 B1 * | 7/2001 | Shimizu et al. | 429/217 |
| 6,277,521 B1 | 8/2001 | Gao et al. | |
| 6,280,879 B1 | 8/2001 | Andersen et al. | |
| 6,316,142 B1 | 11/2001 | Delnick et al. | |
| 6,361,756 B1 | 3/2002 | Gao et al. | |
| 6,451,480 B1 | 9/2002 | Gustafson et al. | |
| 6,461,762 B1 | 10/2002 | Yang et al. | |
| 6,534,219 B1 | 3/2003 | Lijima | |
| 6,579,475 B2 | 6/2003 | Gao et al. | |
| 6,582,852 B1 | 6/2003 | Gao et al. | |
| 6,706,447 B2 | 3/2004 | Gao et al. | |
| 6,794,085 B2 | 9/2004 | Gao et al. | |
| 6,936,377 B2 | 8/2005 | Wensley et al. | |
| 7,129,005 B2 | 10/2006 | Wensley et al. | |
| 7,198,870 B2 | 4/2007 | Wensley et al. | |
| 7,276,314 B2 | 10/2007 | Gao et al. | |
| 7,348,096 B2 | 3/2008 | Schubert et al. | |
| 7,968,233 B2 | 6/2011 | Nelson et al. | |
| 2002/0039680 A1 | 4/2002 | Hwang et al. | |
| 2002/0061441 A1 * | 5/2002 | Ogura et al. | 429/218.1 |
| 2002/0122985 A1 | 9/2002 | Sato et al. | |
| 2002/0182506 A1 * | 12/2002 | Cagle | B82Y 30/00 429/231.8 |
| 2003/0039889 A1 * | 2/2003 | Park et al. | 429/231.1 |
| 2004/0002005 A1 * | 1/2004 | Gao et al. | 429/231.95 |
| 2004/0229127 A1 | 11/2004 | Wensley et al. | |
| 2004/0253520 A1 | 12/2004 | Wensley et al. | |
| 2005/0026042 A1 | 2/2005 | Vallee et al. | |
| 2005/0064290 A1 * | 3/2005 | Panzer et al. | 429/218.1 |
| 2005/0153209 A1 | 7/2005 | Vallee et al. | |
| 2005/0224764 A1 | 10/2005 | Ma et al. | |
| 2005/0263596 A1 | 12/2005 | Nelson et al. | |
| 2006/0057463 A1 | 3/2006 | Gao et al. | |
| 2006/0147792 A1 | 7/2006 | Nelson et al. | |
| 2006/0228468 A1 | 10/2006 | Lain et al. | |
| 2007/0006680 A1 | 1/2007 | Dover et al. | |
| 2007/0190422 A1 | 8/2007 | Morris | |
| 2009/0035663 A1 | 2/2009 | Yakovleva et al. | |
| 2009/0061321 A1 | 3/2009 | Yakovleva et al. | |

OTHER PUBLICATIONS

Venkatasetty, H.V. (Ed.), Lithium Battery Technology, John Wiley, New York (1984).
Pistoia, G. (Ed.), Lithium Batteries: New Materials, Developments, and Perspectives, Industrial Chemistry Library, vol. 5, Elsevier, Amsterdam (1994).
Zheng, et al. "Reactivity of the Solid Electrolyte Interface on Carbon Electrodes at Elevated Temperatures," Journal of the Electrochemical Society, vol. 146, No. 11. pp. 4014-4018, (1999).
Kwon, et al., "Characteristics of a lithium-polymer battery based on a lithium power anode," Journal of Power Sources, vol. 93, pp. 145-150 (2001).
Power Paper "Thin and Flexible Batteries," Power Paper, Ltd., (2003).
RFID, "New Way to Print Ink Antennas," RFID Journal, (2003).
Gholam-Abbas Nazri, et al. (Eds.), Lithium Batteries, Science and Technology, Kluwer Academic (2004).
Korean Patent Application No. 941781.
Xeno Energy—Lithium Powder; http://www.xenolithium.com/LithiumPowder.php (Dec. 9, 2003).

* cited by examiner

LITHIUM INKS AND ELECTRODES AND BATTERIES MADE THEREFROM

RELATED APPLICATIONS

This application is a divisional of U.S. patent application Ser. No. 13/111,184, filed on May 19, 2011, allowed, which is a divisional of U.S. patent application Ser. No. 11/061,751, filed on Feb. 18, 2005, now U.S. Pat. No. 7,968,233, which claims the benefit of provisional patent application Ser. No. 60/545,179, filed Feb. 18, 2004. Each of the above-referenced applications is incorporated by reference herein in its entirety.

FIELD OF THE INVENTION

The invention generally relates to lithium metal powder based inks, anodes made from the inks, and primary and secondary lithium metal batteries made from the anodes.

BACKGROUND

Lithium primary and secondary batteries are an important component in developing many energy-related applications ranging from vehicles to consumer electronics. The material properties of lithium, however, present problems in many applications, as well as in the manufacturing process. In particular, lithium foils can be difficult to work with and are not suitable for many important commercial applications particularly when ultra thin layers of lithium are desirable. A general need exists to improve the processability of lithium materials for use in batteries for a wide variety of applications. More particularly, better lithium materials are needed for use in polymer electrolyte batteries and thin film structures. Some efforts have been made to develop lithium deposition methods based on sprays or vapor deposition, but these methods can involve toxic solvents or expensive equipment. Also important is the ability to control the interface between the electrolyte and the lithium electrode, particularly when the electrolyte is a solid and to control dendrite growth for secondary batteries.

Recently, attempts have been made to produce lithium battery anodes from compositions made from lithium powders. For example, PCT application publication no. WO 02/21632 to Xeno Energy Co. describes a lithium powder anode. The anode is made from an emulsified lithium powder in an inorganic oil. However, this reference does not describe use of lithium powder in an ink form. Specifically, this publication does not describe use of lithium powder in combination with a polymeric binders in a solvent. Furthermore, the compositions in this publication are limited to those including lithium powders having relatively large average particle diameters.

U.S. Pat. No. 5,776,369 also describes preparation of lithium powders using an emulsion in hydrocarbon oil. The emulsified particles are filtered from the oil. Particle size is 10 to 100 microns. Korean Patent Application 1994-1781 also describes lithium powders. U.S. Patent Publication Number 2002/0119373 (U.S. Pat. No. 6,706,447) and 2004/0002005 to Gao et al. describe lithium slurries for use in lithium battery anodes. In the disclosed compositions, lithium metal powder and a host material are mixed with a non-aqueous liquid such as THF and a binder, and formed into a slurry. Alternatively, a lithium metal powder can be provided in the anode by, for example, immersing the host material in a suspension containing lithium metal powder in a non-aqueous liquid such as hydrocarbon solvent such as hexane. However, the compositions described in these publications are not formulated to be applied by printing. Instead, the compositions are applied by casting. Anodes produced using the compositions are quite thick, with average layer thicknesses of 50 to 150 microns.

In J. Power Sources, 93, 2001, 145-150), Kwon et al. also describe lithium powder based anodes. The anodes are made from a powder slurry containing lithium powder (20-40 microns), PVdF binder, and THF. Like the compositions of Gao et al, the compositions of Kwon are designed to be cast into anodes and not printed.

SUMMARY

The invention is summarized in this non-limiting summary.

Lithium metal powder based inks, anodes made from the inks, and primary and secondary lithium metal batteries made from the anodes are provided herein. The lithium powder based inks include a lithium metal powder, a solvent and a binder, and optionally an electronically conductive material and/or a lithium salt. In most battery applications, the electronically conductive material is present. In particular, the invention provides a lithium ink for use in printing an electrode for a lithium battery, the ink comprising lithium metal powder, a high temperature polymer binder and a solvent. In general, compositions are formulated to function as sophisticated ink formulations rather than mere slurry compositions. For example, the ink spreading properties and viscosity can be carefully controlled, together with particle shape, particle size distribution, and average particle size.

The inks can be formulated to be printed onto substrates using a variety of printing techniques, including screen printing, offset litho printing, gravure printing, flexographic printing, pad printing and ink jet printing. As such, the ink formulations provide significant advantages over lithium powder compositions formulated for application by casting or spin coating. For example, printing techniques, such as offset litho, gravure, flexographic, pad printing and ink jet techniques, allow for the high speed, high volume production of printed substrates (e.g. anodes) that is not possible with casting techniques. In addition, printing allows the inks to be applied in desired shapes and locations, which eliminates the need to punch out appropriately shaped sections from a larger film of cast ink, reducing waste. Printing also makes it possible to form very thin layers of ink on a broad range of substrates, including flexible polymeric substrates and metal substrates. In some cases, layers of ink having an average thickness of no more than about 30 microns, or even less, can be produced. This represents a substantial improvement over cast films of lithium powder compositions which typically have an average film thickness of 50 microns or greater.

The relative amounts of the various components that make up the inks may vary depending a variety of factors, including the viscosity requirements of the chosen printing method and conductivity requirements of the intended application. The viscosity of the ink formulations may be tailored to a chosen printing technique by changing the nature and amount of binder and/or solvent in the formulation, while the conductivity of the ink formulations may be tailored for a selected application by changing the nature and amount of conductive materials and the size of the conductive particles in the ink formulations. In some embodiments, when the inks are printed onto a substrate, for example using a screen printing process, they provide an ink layer containing from about 20 to 50 percent lithium powder and from about 10 to 30 percent polymer binder on a dry weight basis. This includes embodiments where the lithium powder based ink includes from about 30 to 45 percent lithium powder, from about 15 to 20 percent polymer binder, from about 20 to 30 percent conductive material and from about 15 to 20 percent lithium salt on a dry weight basis. However, the lithium powder based ink formulations provided herein are not limited to those having components present in amounts falling within these ranges.

The lithium metal powder used to form the lithium inks can be a finely divided lithium metal powder desirably having an average particle size of no greater than about 50 microns. In some instances, the lithium metal powder has an average particle size of no more than about 1 micron. Safety can be an issue in particle size and powder selection. Because the printing processes are capable of applying very thin layers of ink, in some cases the lithium powder size may be the limiting factor in minimizing the average layer thickness.

Binders can be included in the inks to adjust the viscosity of the formulations and to facilitate the adherence of the lithium metal powder particles to a substrate, such as a metal anode current collector. Although a variety of polymer binders may be employed, it has been discovered that high temperature polymer binders, such as polyimide polymer binders are well-suited for use with the inks provided herein. The polyimides may be pre-imidized polyimides and are desirably provided as amorphous, thermoplastic polyimide powders soluble in a polar solvent, such as γ-butyrolactone. In some ink formulations, one or more polyimides having a repeat unit weight per imide ring of no more than 350 are employed.

The solvents used in the lithium powder based inks should be capable of dissolving the polymer binder and should be sufficiently non-reactive with the lithium powders for the application. In addition they should be volatile enough to allow the inks to dry in a reasonable time frame after printing, yet not so volatile that they evaporate prematurely, clogging printer parts, such as ink jet heads. In some instances the solvent may be a solvent mixture. Not all solvents that are typically used in conducting ink formulations are well-suited for use as printing solvents for lithium based inks. Generally, suitable solvents will be anhydrous aprotic organic solvents. The inventors have discovered, for example, that gamma butyrolactone (GBL) is particularly well suited for use in lithium powder based inks designed for printing applications, particularly when combined with a polyimide binder.

A conductive material may also be included in the ink formations to enhance their conductivity and to ensure good electrical contact between the parts of electronics (e.g. batteries) into which they are incorporated. Typically these materials will take the form of a conductive powder. Examples of conductive materials that may be added to the ink formulations include carbonaceous materials, such as carbon powders and/or carbon nano-tubes. In some formulations, the amount of conductive materials may be greater than the amount of lithium powder.

Lithium salts for use in the ink formulations include those lithium salts that are commonly used in lithium metal and lithium ion batteries. Many such salts are well known and commercially available. $LiPF_6$, $LiBF_4$, lithium perfluorosulfonate salts, and lithium bis(trifluoromethanesulfonyl)imide (LiTFSi) are examples of a suitable lithium salts.

Anodes made from the lithium metal powder based inks include an anode current collector and an electrode layer disposed on the anode current collector. Also provided from the invention is an anode comprising: (a) an anode current collector; and (b) an electrode layer disposed on the anode current collector, the electrode layer comprising lithium powder and a high temperature polymer binder. The electrode layer can be formed from the lithium powder based inks and includes lithium metal powder a polymeric binder and optionally, at least one conductive material and/or at least one lithium salt. The anode may be produced by printing a lithium metal powder based ink onto a current collector, such as a metal foil. However, more conventional application techniques, such as casting may also be employed, although such techniques generally less efficient and more time consuming.

Primary and secondary batteries which incorporate the anodes provided herein include at least one anode, at least one cathode, and an electrolyte in electrochemical communication with each anode and each cathode. The batteries are characterized by high specific energy densities, high unit cell voltages, high specific capacities and long lifetimes and improved electrochemical stability. In some embodiments multiple parts, including anodes, cathodes and electrode layers may be produced by printing. Also provided in this invention is a lithium metal battery comprising: (a) a cathode; (b) an anode comprising a printed electrode layer comprising lithium metal powder and a polymer binder; and (c) a polymer electrolyte sandwiched between the cathode and the anode.

The electrolyte may be a solid polymer electrolyte, a polymer matrix electrolyte (PME), or a liquid electrolyte generally containing a lithium salt. A battery based on a liquid electrolyte will typically include a separator film disposed between each anode and each cathode with the liquid electrolyte distributed between each anode, each cathode and each separator film. The liquid electrolyte desirably includes a lithium salt, such as $LiPF_6$, in an organic solvent and the separator films are typically porous organic polymer films saturated with the liquid electrolyte. Polymer electrolytes are generally gel type electrolytes which trap solvent and salt in the pores of the polymer to provide a medium for ionic conduction.

Polymer Matrix Electrolytes provide an alternative to more conventional liquid and solid polymer electrolytes. Polymer matrix electrolytes differ from solid polymer electrolytes in that once the polymer matrix electrolyte is formed, the electrolyte is substantially free of non-absorbed solvent or identifiable pores. Instead, the solvent is integrated with the polymer and the lithium salt in a homogeneous and substantially optically clear matrix. In addition, unlike conventional gel polymers where the polymer only provides mechanical support, the polymer, salt and solvent that make up the PME all participate in ionic conduction. In one exemplary battery construction, the electrolyte is a PME made from a polyimide, at least one lithium salt in a concentration of at least, 0.5 moles of lithium per mole of imide ring provided by said polyimide and at least one solvent intermixed with the polyimide and the lithium salt to provide a polyimide matrix electrolyte which is substantially optically clear.

Also provided are electronic devices, such as radiofrequency identification devices, Smart Cards, Time Temperature Indicators (TTI) and wearable external medical devices, powered by the batteries provided herein.

In another embodiment, provided is a lithium salt-based ink for use in printing an anode for a lithium ion battery, the ink comprising an intercalation carbon material, a conductivity enhancing carbon material, a lithium salt, a high temperature polymer binder, and a solvent.

Various non-limiting, numbered, illustrative embodiments are described as follows:

1. A lithium ink for use in printing an electrode for a lithium battery, the ink comprising lithium metal powder, a high temperature polymer binder and a solvent.

2. The lithium ink of embodiment 1, wherein the high temperature polymer is capable of complexing with lithium salts and participating in ionic conduction.

3. The lithium ink of embodiment 2, wherein the high temperature polymer binder comprises a polyimide.

4. The lithium ink of embodiment 2, wherein the high temperature polymer binder comprises a polybenzimidazole.

5. The lithium ink of embodiment 2, wherein the high temperature polymer binder comprises a polyamide-imide.

6. The lithium ink of embodiment 1, wherein the high temperature polymer binder comprises a high temperature polymer selected from the group consisting of polyamides, polyphenylene oxides, polyarylates, polyester-imides, polyester-amide-imides, poly(benzoxazoles), polysulfones, polyether sulfones, polysulfonamides, poly(quinoxaline), poly(para-phenylenes), poly(aryl ethers) substituted with a pyridyl group, poly(aryl ether sulfones), polyepoxides or a combination thereof.

7. The lithium ink of embodiment 1, wherein the high temperature polymer has a glass transition temperature of at least 150° C.

8. The lithium ink of embodiment 2, wherein the high temperature polymer has a glass transition temperature of at least 150° C.

9. The lithium ink of embodiment 3, wherein the polyimide comprises a pre-imidized, amorphous, thermoplastic polyimide powder that is soluble in a polar solvent.

10. The lithium ink of embodiment 1, further comprising at least one electronically conductive material.

11. The lithium ink of embodiment 1, further comprising at least one lithium salt.

12. The lithium ink of embodiment 1, wherein the lithium powder has an average particle size of no more than about 50 microns.

13. The lithium ink of embodiment 1, wherein the lithium powder has an average particle size of no more than about 20 microns.

14. The lithium ink of embodiment 1, wherein the lithium powder has an average particle size of no more than about 1 micron.

15. The lithium ink of embodiment 1, wherein the lithium powder has an average particle size of no more than about 100 nanometers.

16. The lithium ink of embodiment 1, wherein the ink has a viscosity from about 0.5 to 50 Pa-sec at 25° C.

17. The lithium ink of embodiment 1, wherein the ink has a viscosity from about 50 to 100 Pa-sec at 25° C.

18. The lithium ink of embodiment 1, wherein the ink has a viscosity from about 0.01 to 0.5 Pa-sec at 25° C.

19. The lithium ink of embodiment 3, comprising about 20 to 50 percent lithium powder, about 15 to 40 percent conductive material and about 10 to 25 percent polyimide binder on a dry weight basis.

20. The lithium ink of embodiment 3, comprising about 50 to 70 percent lithium powder, about 30 to 40 percent conductive material and about 10 to 15 percent polyimide binder on a dry weight basis.

21. The lithium ink of embodiment 1, wherein the solvent comprises gamma-butyrolactone.

22. The lithium ink of embodiment 21, wherein the lithium powder has an average particle size of about 1 micron to about 100 microns, and the ink further comprises at least one electrically conductive material and at least one lithium salt.

23. A lithium ink for use in printing an electrode for a lithium battery, the ink comprising a mixture of about 20 to 50 percent lithium powder and 10 to 50 percent polymer binder on a dry weight basis in a polar solvent.

24. The lithium ink of embodiment 23, wherein the polar solvent is gamma-butyrolactone.

25. The lithium ink of embodiment 23, further comprising an electrically conductive material and a lithium salt.

26. The lithium ink of embodiment 23, wherein the lithium powder has an average particle size of no more than about 20 microns.

27. A lithium ink for use in printing an electrode for a lithium battery, the ink comprising lithium metal powder, a polymer binder, a lithium salt and a solvent.

28. The lithium ink of embodiment 27 comprising from about 10 to 30 percent lithium salt on a dry weight basis.

29. The lithium ink of embodiment 27 comprising from about 15 to 20 percent lithium salt on a dry weight basis.

30. The lithium ink of embodiment 27 comprising about 30 to 45 percent lithium powder, about 20 to 35 percent conductive material, from about 10 to 23 percent binder and from about 10 to 25 percent lithium salt on a dry weight basis.

31. The lithium ink of embodiment 27 having a viscosity of about 0.5 to 100 Pa-sec at 25° C.

32. An anode comprising:
(a) an anode current collector; and
(b) an electrode layer disposed on the anode current collector, the electrode layer comprising lithium powder and a high temperature polymer binder.

33. The anode of embodiment 32, wherein the high temperature polymer binder comprises a polyimide.

34. The anode of embodiment 32, wherein the lithium powder has an average particle size of no more than about 20 microns.

35. The anode of embodiment 32, wherein the lithium powder has an average particle size of no more than about 10 microns.

36. The anode of embodiment 32, wherein the lithium powder has an average particle size of no more than about 100 nanometers.

37. The anode of embodiment 33, wherein the polyimide polymer binder comprises a pre-imidized polyimide.

38. The anode of embodiment 32 wherein the electrode layer has an average thickness of no more than 30 microns.

39. The anode of embodiment 32, wherein the electrode layer further comprises at least one electronically conductive material.

40. The anode of embodiment 32, wherein the electrode layer further comprises at least one lithium salt.

41. The anode of embodiment 33, wherein the polyimide comprises a pre-imidized, amorphous, thermoplastic polyimide powder that is soluble in a polar solvent, wherein the electrode layer further comprises at least one electronically conductive material, and wherein the electrode layer further comprises at least one lithium salt.

42. A battery comprising:
(a) at least one anode, the anode comprising:
(i) an anode current collector; and
(ii) an electrode layer disposed on the anode current collector, the electrode layer comprising lithium metal powder and a high temperature polymer binder; and
(b) at least one cathode; and (c) an electrolyte in electrochemical communication with the each cathode and each anode.

43. The battery of embodiment 42, wherein the high temperature polymer binder comprises a polyimide.

44. The battery of embodiment 42, wherein the electrode layer has an average thickness of no more than 30 microns.

45. The battery of embodiment 42, wherein the electrolyte comprises a solid polymer electrolyte.

46. The battery of embodiment 42, wherein the electrolyte comprises a polyimide solid polymer electrolyte.

47. The battery of embodiment 46, wherein the electrolyte comprise about 10 weight percent solvent or less.

48. The battery of embodiment 46, wherein the electrolyte comprises about 15 weight percent to about 40 weight percent solvent or less.

49. The battery of embodiment 42, wherein the lithium powder has an average particle size of no more than about 50 microns.

50. The battery of embodiment 42, wherein the lithium powder has an average particle size of no more than about 1,000 nm.

51. The battery of embodiment 49, wherein the binder comprises a pre-imidized polyimide.

52. The battery of embodiment 42, wherein the electrolyte is optically clear.

53. The battery of embodiment 42, wherein the cathode comprises:
(a) a cathode current collector; and
(b) an electrode layer disposed on the cathode current collector, the electrode layer comprising a polyimide, an electronic conductive filler and a metal oxide.

54. The battery of embodiment 42, wherein the anode, cathode, and electrolyte each comprise pre-imidized, amorphous, thermoplastic polyimide that is soluble in a polar solvent.

55. The battery of embodiment 54, wherein the anode further comprises at least one electronically conductive material and at least one lithium salt, and the electrolyte is optically clear and comprises at least one solvent.

56. A lithium metal battery comprising:
(a) a cathode;
(b) an anode comprising a printed electrode layer comprising lithium metal powder and a polymer binder; and
(c) a polymer electrolyte sandwiched between the cathode and the anode.

57. The battery of embodiment 56, wherein the electrode layer is printed on a current collector.

58. The battery of embodiment 57, wherein the electrode layer is printed on the polymer electrolyte.

59. The battery of embodiment 58, wherein the polymer electrolyte is a polyimide polymer matrix electrolyte.

60. The battery of embodiment 58, wherein the polymer binder is a polyimide binder.

61. The battery of embodiment 57, wherein the cathode is printed on a cathode current collector.

62. The battery of embodiment 58, wherein the polymer electrolyte is printed on the cathode.

63. The battery of embodiment 56, wherein the electrode layer is screen-printed.

64. The battery of embodiment 56, wherein the electrode layer is offset litho printed.

65. The battery of embodiment 56, wherein the electrode layer is gravure printed.

66. The battery of embodiment 56, wherein the electrode layer is flexographically printed.

67. A method of printing an anode for a lithium battery comprising:

formulating an ink according to embodiment 1,
printing the ink on a current collector.

68. The method according to embodiment 67, wherein the printing is screen-printing.

69. The method according to embodiment 67, wherein the printing is offset litho printing.

70. The method according to embodiment 67, wherein the printing is gravure printing.

71. The method according to embodiment 67, wherein the printing is flexographic printing.

72. The method according to embodiment 67, wherein the printing is ink jet printing.

73. The method according to embodiment 67, wherein the ink comprises a polyimide binder.

74. The method according to embodiment 67, wherein the ink further comprises at least one electronically conductive material.

75. The method according to embodiment 67, wherein the ink further comprises at least one lithium salt.

76. The method according to embodiment 67, wherein the lithium powder of the ink has an average particle size of about 10 nm to about 1,000 nm.

77. The method according to embodiment 67, wherein the lithium powder of the ink has an average particle size of about one micron to about 50 microns.

78. A radiofrequency identification device powered by the battery of embodiment 42 or embodiment 56.

79. The radiofrequency identification device of embodiment 78, wherein the device is a Time Temperature Indicator.

80. A Smart Card powered by the battery of embodiment 42 or embodiment 56.

81. A wearable medical device powered by the battery of embodiment 42 or embodiment 56.

82. The wearable medical device of embodiment 81, where the device is selected from the group consisting of external defibrillators, wearable infusion pumps, patient monitors and electrical stimulation devices.

DETAILED DESCRIPTION

I. Introduction

Figure 1:
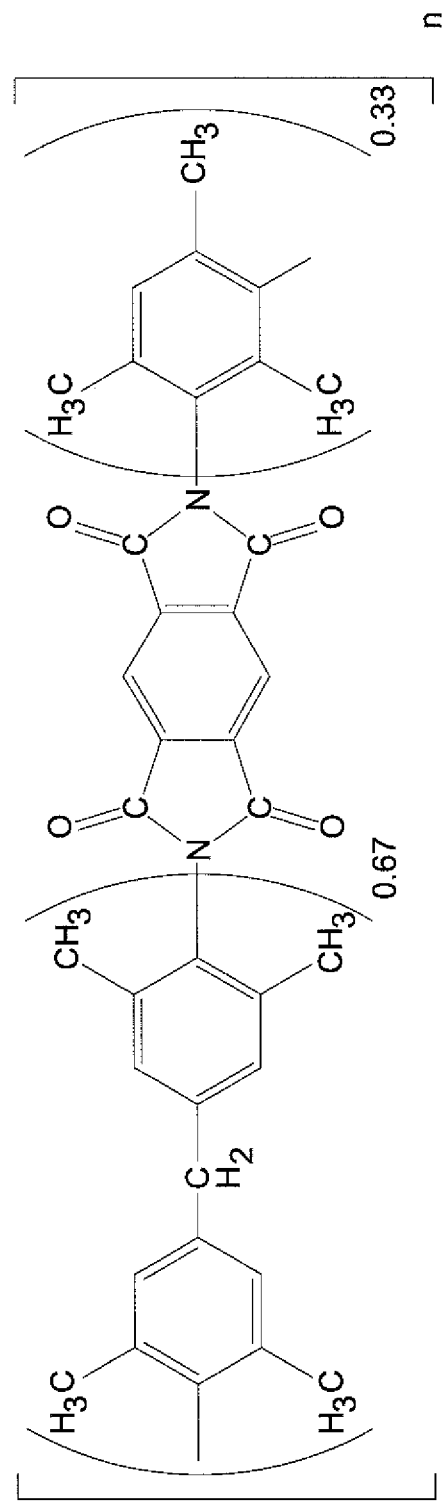
FIG. 1 provides an example of a polyimide useful for the invention.

Provisional patent application Ser. No. 60/545,179 filed Feb. 18, 2004 to Nelson and Wensley is hereby incorporated by reference in its entirety including figures and claims.

Lithium metal powder based inks, anodes made from the inks, and primary and secondary lithium metal batteries made from the anodes are provided herein. The inks are made from a solution or slurry of lithium metal powder and a binder in an appropriate solvent. Optional ingredients include conductive materials and lithium salts. The inks are well suited for fabricating anodes for low-profile, small volume lithium metal batteries using simple printing techniques such as silk screen printing and high speed, high volume printing techniques, such as offset litho printing, gravure printing, flexographic printing, pad printing and ink jet printing.

Lithium batteries are generally described in, for example, *Lithium Batteries, Science and Technology*, (Eds. Gholam-Abbas Nazri and Gianfranco Pistoria), Kluwer Academic, 2004, including both lithium metal and lithium ion batteries. For example, section II describes anode materials (including lithium alloys in chapter 9), and section IV describes electrolytes including polymer electrolytes (Chapter 19). A series of applications are described in Chapter 20 including battery assembly, EV applications, HEV applications, stationary applications, and space applications. Medical applications are described in chapter 21. Other examples of reference materials for lithium batteries include: (1) J. P. Gabano (Ed.), *Lithium Batteries*, Academic Press, London (1983); (2) H. V. Venkatasetty, (Ed.), *Lithium Battery Technology*, John Wiley, New York (1984), and (3) G. Pistoia, (Ed.), *Lithium Batteries: New Materials, Developments, and Perspectives*, Industrial Chemistry Library, Vol. 5, Elsevier, Amsterdam (1994).

II. Lithium Metal Powders

The lithium metal powders used in the production of the lithium inks can be generally finely divided lithium metal powders, desirably having an average particle size of no more than about 500 microns, no more than about 100 microns or no more than about 50 microns. In some instances the average particle size of the lithium metal powder is not more than about 20 microns, in other instances the average particle size of the lithium metal powder is no more than about 10 microns and in still other instances the average particle size of the lithium metal powder is no more than about 1 micron. For example, lithium metal powders having an average particle size from about 1 to 100 microns may be employed. Lithium powders can be lithium mixed with other compositions to form alloys and other mixtures.

The production of lithium metal powders suitable for use in lithium inks has been described in the literature. For example, U.S. Pat. No. 5,776,369, the complete disclosure of which is incorporated herein by reference, describes a method for preparing lithium metal powder having a particle size of 10 to 100 microns. Another suitable lithium metal powder and methods for its production are disclosed in PCT patent application no. PCT/KR00/01001, the entire disclosure of which is incorporated herein by reference. Lithium metal powders suitable for use in the ink formulations provided herein are available commercially from Xeno Energy Co. Ltd., (Seoul, KR).

Nanoscale lithium metal powders may also be used to formulate the lithium inks provided herein. As used herein a "nanoscale" lithium metal powder is a lithium metal powder having an average particle size of no more than about 1 micron. This includes powders having an average particle size of no more than about 500 nanometers, further includes powders having an average particle size of no more than about 100 nanometers, still further includes powders having an average particle size of no more than about 70 nanometers, yet further includes powders having an average particle size of no more than about 50 nanometers and still further includes powders having an average particle size of no more than about 20 nanometers. For example, the lithium metal powders may have an average particle size from about 10 to 1,000 nanometers. The nanoparticles may be highly uniform in size and possess a high level of purity. The use of nanoscale particles is advantageous because such small-scale particles may provide increased energy densities compared with larger diameter lithium powders. As such, the use of nanoscale particles makes it possible to produce batteries with higher capacities for a given amount of lithium. The result is smaller batteries with longer lifetimes.

III. Polymer Binders

The lithium inks may include at least one polymer binder. The binder forms a film in which the lithium powder is embedded once the ink has dried. Blends of polymers can be used. Suitable polymer binders for use in some of the inks provided herein include, but are not limited to, polyvinylidene fluoride, polyethylene oxide, polyethylene, polypropylene, polytetrafluoroethylene, polyacrylates and mixtures and copolymers thereof.

However, high temperature polymers having high glass transition temperatures are particularly desirable for use as binders in the ink formulations. High temperature polymers are a class of polymers well-known to those skilled in the polymer field. These polymers are typically used in the fabrication of articles which may be subjected to high temperatures (e.g. 400° C.-500° C., or greater). Special processing equipment may be needed to handle these high temperature polymers in normal processing because of the high glass transition. These materials are characterized by high glass transition temperatures and, when crystalline, melting points and are generally resistant to many solvents unless the polymer structure is modified to improve solubility. Polymers, including high temperature polymers, having functional groups capable of complexing with lithium salts and participating in ionic conduction are particularly preferred. Suitable high temperature polymers include, polyimides, polyamides, polyphenylene oxides, polyarylates, polyamide-imides (PAIs), polyester-imides, polyester-amide-imides, polybenzimidazoles (PBIs) and poly(benzoxazoles). Polysulfones, polyether sulfones, polysulfonamides, poly(quinoxaline) (PPQ), poly(para-phenylenes), poly(aryl ethers) (PAE-2s) substituted with a pyridyl group, poly(aryl ether sulfones) and polyepoxides may also be used. In some cases the high temperature polymers may be functionalized or modified to make them suitable for use in lithium metal batteries, as one of skill in the art would understand. Blends of polymers can be used including blends comprising the high temperature polymer and also a different type of polymer to the extent the application allows.

Figure 2:
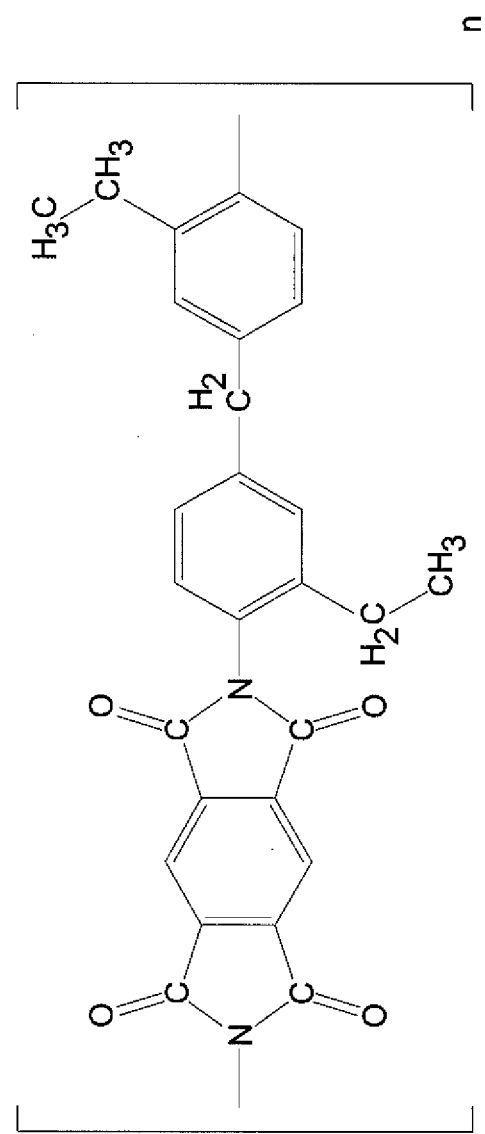
FIG. 2 provides an example of a polyimide useful for the invention.
Figure 3:
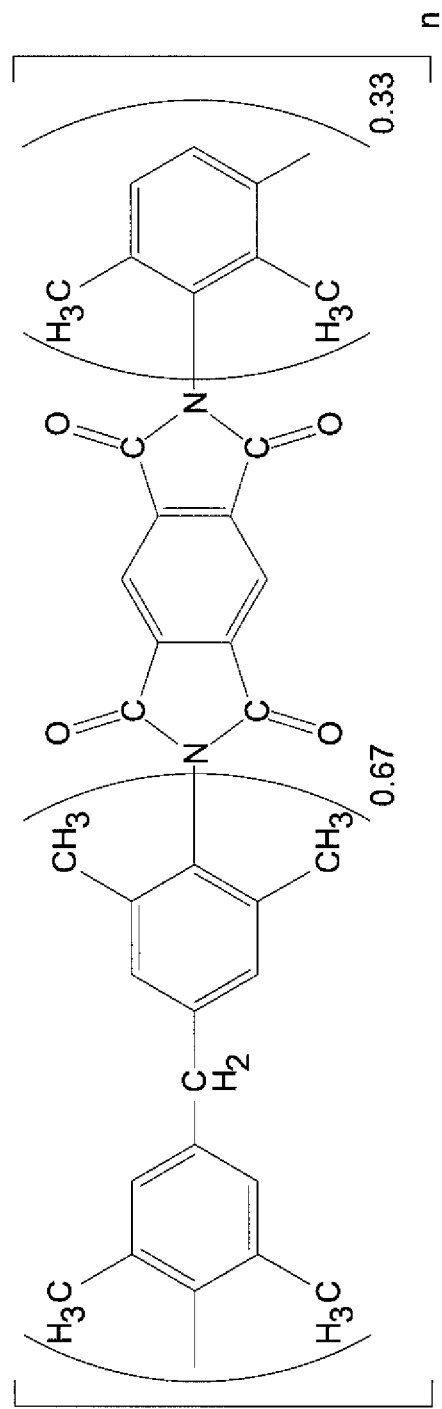
FIG. 3 provides an example of a polyimide useful for the invention.

In some embodiments, the high temperature polymer is a polyimide that is substantially soluble in the solvent used to formulate the lithium ink. Suitable polyimides for use in the inks provided herein are described in U.S. Pat. Nos. 5,888,672 and 6,451,480, the disclosures of which are incorporated herein by reference. The polyimides may be pre-imidized and are desirably provided as amorphous, thermoplastic polyimide powders. The use of amorphous polyimides is advantageous because, unlike crystalline or semi-crystalline polymers, their amorphous nature provides an unobstructed pathway for ionic mobility. Suitable polyimides are commercially available. These include MATRIMID 5218 and 9725 commercially available from Ciba-Geigy; ULTEM 1000 and 2000 commercially available from General Electric; and LaRC-CP1, LaRC-CP2 and LaRC-SI all of which are available from Imitec, Inc., Schenectady, N.Y. Other suitable polyimides are described in U.S. Pat. Nos. 4,629,777 and 4,474,858, the disclosures of which are incorporated herein by reference. Some ink formulations will include one or more polyimides having a repeat unit weight per imide ring of no more than about 350. Such polyimides are disclosed in pending U.S. patent application Ser. Nos. 10/437,778; 10/437,559; and 10/437,546, filed May 13, 2003 to Wensley et al., the disclosures of which are incorporated herein by reference. FIGS. 1-3 show the structures for three polyimides that may be used as binders in the ink compositions provided herein.

In addition to polyimides, other generally glassy amorphous polymers can be used including, for example, high glass transition temperature polymers (e.g., Tg greater than 150° C.; Tg greater than 180° C.; Tg greater than 200° C.; Tg greater than 250° C.; Tg greater than 350° C.). In general, the polymer can have polar groups which can complex with lithium salts and participate in ionic conduction. In some instances it is desirable to employ polymers having a Tg in the lower Tg range because they are easier to process.

The solvents in the inks can be typically anhydrous, aprotic polar organic solvents which are sufficiently chemically stable toward lithium metal, and capable of solvating, the lithium powders, polymeric binders and any conductive materials or lithium salts. Suitable polar solvents include, but are not limited to, gamma-butyrolactone (GBL), tetrahydrofuran (THF) and propylene carbonate (PC). GBL is particularly well-suited for printing applications. Other suitable solvents include dioxane, 1,3-dioxolane, 1,2-dimethyloxyethane and dimethylsulfoxide.

IV. Other Components

Electronically conductive materials may also be added to the inks in order to enhance their conductivity for a given application. Carbonaceous materials, such as carbon powder or carbon nano-tubes, may be used to increase the conductivity of the inks. In addition, lithium salts may be added to the inks. $LiPF_6$, lithium perfluorosulfonate salts, and LiTFSi are well suited for use in the inks. Other suitable lithium salts include, but are not limited to LiCl, LiBr, LiI, LiBOB, $LiClO_4$, $LiBF_4$, $LiAsF_6$, and $LiCF_3SO_3$.

V. Alternative Embodiment

An alternative to the highly active lithium metal powder for ink formulation would be to substitute an intercalation carbon to absorb lithium that came from another source. For example, the formulation can contain (i) a fine carbon such as mesocarbon microbeads (MCMB) 6-10 or 6-25 manufactured by Osaka Gas Chemical Co. LtD., (ii) a conductivity enhancing carbon such as Super P from TimCal Graphite & Carbon Co. or carbon nanotubes, (iii) a binder polymer, (iv) a lithium salt, and (v) a solvent such as GBL or mixtures of solvents. This mixture would be capable of being printed and dried to provide a lithium active anode. The amounts of each of the components can be adjusted to provide an effective ink formulation (e.g., viscosity, solids content) for a particular application, substrate, and printing method. For example, binder polymers, lithium salts, and solvents described herein can be used including, in particular, high temperature polymers such as polyimides and soluble polyimides. By way of background, MCMB electrode formulations are described in, for example, U.S. Pat. Nos. 6,534,219; 6,461,762; 6,174,627; 6,168,885; and 6,046,268.

VI. Printing and Formulations

Application techniques for the inks include both conventional coating techniques and printing techniques. For example, the inks can be coated onto a surface, such as a current collector by vapor deposition, dip coating, spin coating and brush coating. However, the inks are preferably formulated to be printed onto a surface. Application of the lithium inks using printing methodologies is particularly advantageous because such methodologies allow for high speed, high volume application of the lithium inks to underlying substrates, such as metal current collectors. This is particularly advantageous in the manufacture of lithium metal batteries because it is simpler and faster than more conventional production techniques where lithium metal foils are laminated to anode current collectors. Moreover, printing the inks eliminates the need for more complicated and expensive coating techniques, such as vapor deposition. In addition, by printing the inks onto a surface, such as a current collector, better interfaces may be produced and the need to spray a lithium composition is eliminated, reducing waste and environmental concerns. Many printing application also make it possible to deposit very thin layers of the inks. This reduces cost and makes thinner electronic components possible. For example, depending upon the particle size of the lithium powder used to formulate the inks, layers of lithium ink having an average layer thickness of no more than about 40 microns may be printed. This includes layers of ink having an average layer thickness of not more than about 30 microns, further includes layers of ink having an average layer thickness of not more than about 20 microns and still further includes layers of ink having an average layer thickness of not more than about 10 microns.

The inks may be printed onto a substrate using a variety of printing methods, including screen printing, offset litho printing, gravure printing, flexographic printing, pad printing and ink-jet printing.

Screen printing uses a screen coated with a light sensitive emulsion or film, which blocks the holes in the screen. An image to be printed is supplied to the film. The imaged screen is then exposed to ultra-violet light followed by the washing away of any light sensitive emulsion that has not been hardened by the ultra-violet light. This leaves an open stencil which corresponds to the image that was supplied on the film. The screen is fitted on a press and the substrate to be printed is placed in position under the screen while ink is placed on top of the screen. A blade is pulled across the top of the screen, pushing the ink through the mesh onto the substrate to be printed. The lithium ink formulations for screen printing desirably have viscosities of about 0.5 to 50 Pa-sec and more desirably 1 to 30 Pa-sec at 25° C. Using a screen printing process, a layer of lithium powder based ink having an average thickness of no more than about 30 microns and desirably no more than about 15 microns may be printed onto a substrate, provided the ink is prepared from a powder having a sufficiently small particle size.

In offset litho printing, generally, images are supplied to printing plates, which are dampened by ink which adheres to the image area. The image is then transferred to a rubber blanket, and from the rubber blanket to a substrate. Typical viscosities for lithium powder based inks for use in offset litho printing are from about 10 to about 100 Pas at 20° C., desirably from about 30 to 80 Pas at 20° C. Offset litho printing is capable of providing very thin layers of ink. In fact the layer thickness of the printed ink may be limited by the particle size of the lithium powder. For example, if lithium powder having small enough particle sizes are employed, lithium powder based inks can be applied in layers having an average thickness of from about 0.5 to 2 microns.

Gravure printing uses, generally, a cylinder onto which an image has been engraved with cells. To print, the cells are filled with ink and the substrate to be printed is passed between the printing cylinder and an impression roller. The lithium powder based inks used with gravure printing typically have viscosities much lower than those used with screen or offset litho printing. For example, some gravure printing inks will have a viscosity from about 0.01 to 0.5 Pa-sec at 25° C., desirably from about 0.05 to 0.2 Pa-sec at 25° C. Like offset litho printing, gravure printing is capable of printing very thin layers of lithium ink. For example, depending on the size of the lithium powders used, gravure printing may be used to print lithium ink in layers having an average thickness of about 0.8 to 8 microns.

In flexographic printing, a screened roller is generally used to apply a thin layer of relatively fluid ink to the surface of a flexible printing plate. A rotating plate roller is then used to bring the inked surface of the printing plate into contact with a web to be printed and an impression roller presses the web against the plate to effect the transfer of the ink. The lithium ink formulations for flexographic printing have viscosities similar to those used for gravure printing, desirably from about 0.01 to 0.7 Pa-sec and more desirably 0.05 to 0.5 Pa-sec at 25° C. Depending on the size of the lithium powders used to formulate the inks, flexographic printing may be used to produce ink layers with an average thickness from about 0.5 to 5 microns, desirably from about 0.8 to 2.5 microns.

In pad printing an image to be transferred generally is etched into a printing plate known as a cliché. The cliché is initially flooded with ink and then cleaned to leave ink only in the image area. A silicon transfer pad is then positioned over the cliché and pressed onto it to transfer the ink. The pad is lifted away from the cliché and the ink is allowed to partially dry, rendering it tackier and more viscous. The pad is then pressed onto a substrate where the ink is deposited. Lithium metal powder based ink formulations for pad printing will have viscosities similar to those of the screen printing ink formulations.

Ink jet printers generally use a series of nozzles to spray drops of ink directly on the paper. Ink jet printers are typically used with inks having viscosities of about 0.001 to 0.05 Pa-sec at 25° C. and can produce ink layers having an average thickness of about 0.1 to 30 microns, desirably 0.3 to 20 microns.

The lithium powder based inks can be provided in a number of different formulations to be used with different printing processes for different applications. Two of the primary considerations when choosing a formulation are the viscosity and conductivity of the ink. As noted above, the viscosity requirements of an ink may vary dramatically based on the printing technique to be used. Viscosity will depend, at least in part, on the amount of solvent and polymer binder present in the composition, and, in particular, on the ratio of the total amount of lithium powder and conductive material to binder in the composition. Another consideration, that can be taken together with viscosity considerations, is the conductivity requirements for a given application.

Several exemplary embodiments of lithium powder based ink compositions are provided below.

In some embodiments, the ratio of (lithium powder+any conductive material+any lithium salt):polymer binder in the lithium powder based inks may be between 3:1 and 6:1. These embodiments are well-suited for use in screen printing applications. In certain embodiments the ink contains from about 20 to 50 percent lithium powder, from about 15 to 40 percent conductive material and from about 10 to 25 percent polymer binder on a dry weight basis, where the dry weight would include the lithium powder and any optional conductive material or lithium salt. This includes embodiments wherein the ink contains from about 30 to 45 percent lithium powder, from about 20 to 35 percent conductive material, from about 15 to 23 percent binder, and optionally from about 10 to 25 percent lithium salt on a dry weight basis. Typically ink formulations fitting these descriptions will be dissolved in an appropriate solvent at about 10 to 25 percent. In some formulations of this type, the binder is a polyimide binder, the conductive material is carbon powder, the lithium salt is $LiPF_6$ or LiTFSi and the solvent is GBL.

Higher viscosity lithium powder based inks may also be produced. Depending on their viscosities, such inks may find use as offset litho printing inks. Such inks are typically significantly less dilute that screen printing inks. In some embodiments these inks contain from about 40 to 80 percent lithium powder, from about 30 to 70 percent conductive material and from about 10 to 20 percent polymer binder on a dry weight basis, where the dry weight would include the lithium powder and any optional conductive material or lithium salt. This includes embodiments wherein the ink contains from about 50 to 70 percent lithium powder, from about 30 to 40 percent conductive material, from about 10 to 15 percent binder, and optionally from about 5 to 15 percent lithium salt on a dry weight basis. Typically ink formulations fitting these descriptions will be dissolved in an appropriate solvent at about 30 to 80 percent, desirably about 40 to 60 percent. In some formulations of this type, the binder is a polyimide binder, the conductive material is carbon powder, the lithium salt is $LiPF_6$ or LiTFSi and the solvent is GBL.

Lithium powder based inks that may find use as flexographic or gravure may have a ratio of (lithium powder+any conductive material+any lithium salt):polymer binder of between 3:1 and 8:1. In some such embodiments the ink contains from about 30 to 60 percent lithium powder, from about 20 to 50 percent conductive material and from about 2 to 15 percent polymer binder on a dry weight basis, where the dry weight would include the lithium powder and any optional conductive material or lithium salt. This includes embodiments wherein the ink contains from about 40 to 50 percent lithium powder, from about 20 to 30 percent conductive material, from about 5 to 10 percent binder, and optionally from about 10 to 20 percent lithium salt on a dry weight basis. Typically ink formulations fitting these descriptions will be dissolved in an appropriate solvent at about 5 to 20 percent, desirably about 10 to 15 percent. In some formulations of this type, the binder is a polyimide binder, the conductive material is carbon powder, the lithium salt is $LiPF_6$ or LiTFSi and the solvent is GBL.

One application for which the lithium powder based inks provided herein are useful is in the production of electrodes, such as anodes for lithium metal batteries. Such anodes may be fabricated with the lithium metal powder based inks provided herein by printing the ink onto the surface of an anode current collector. The anode current collector is an electrically conductive member made from a metal, such as aluminum, copper, nickel, iron or stainless steel. The current collector may be a foil or a grid.

VII. Batteries

The anodes provided herein may be incorporated into both primary and secondary lithium metal batteries. Although different battery constructions are possible, each battery will include at least one anode, at least one cathode and an electrolyte in electrochemical communication with each anode and each cathode. Such batteries represent an improvement over more conventional lithium metal based batteries because the lithium metal powder based anodes tend to suppress the formation of dendrites, extending the lifetime of the batteries.

Lithium metal batteries and related materials into which the anodes provided herein may be incorporated are described in, for example, U.S. Pat. Nos. 5,888,672 and 6,451,480 to Gustafson, as well as pending U.S. patent application Ser. Nos. 10/437,778; 10/437,559; and 10/437,546, all filed May 13, 2003 to Wensley et al., which are hereby incorporated by reference in their entirety and can be used for the practice of the present invention.

One or more anodes in the battery are composed of a current collector with an electrode layer of lithium metal powder in a polymer binder, disposed thereon. The anodes may be formed by printing a lithium powder based ink, of the type described above, onto the current collector and allowing the ink to substantially dry.

The electrolyte may be any suitable electrolyte for use in a lithium metal battery, many of which are known and commercially available. Suitable electrolytes include liquid electrolytes, solid polymer electrolytes and polymer matrix electrolytes (PMEs). In order to provide ionic conductivity to the anode, the electrolytes include at least one lithium salt. Lithium salts that may be used in the electrolytes include, but are not limited to, LiCl, LiBr, LiI, LiClO$_4$, LiBF$_4$, LiAsF$_6$, Li(CH$_3$CO$_2$), Li(CF$_3$SO$_3$), Li(CF$_3$SO$_2$)$_2$N, Li(CF$_3$SO$_2$)$_3$C, Li(CF$_3$CO$_2$), Li(B(C$_6$H$_5$)$_4$), Li(SCN), and Li(NO$_3$). LiPF$_6$ and LiTFSi are particularly well-suited for use in the electrolytes.

Batteries that use a liquid electrolyte include a separator film disposed between each anode and each cathode. In this construction, the separator films are typically porous organic polymer films saturated with the lithium salt electrolyte solution. Any separator film known to those skilled in the art may be used as a barrier between each anode and cathode layer. The separator film is typically a freestanding film comprised of an organic polymer, such as polypropylene, polyethylene or polyvinylidene fluoride, and is generally saturated with a liquid lithium electrolyte solution. Examples of such films include but are not limited to Kynar-FLEX from Atochem North America; and CELGARD 3401 from Celgard, Inc.

Solid polymer electrolytes can be generally gel type electrolytes, which trap solvent and salt in the pores of the polymer to provide a medium for ionic conduction. The polymer electrolytes generally can function as separators between anodes and cathodes and as electrolytes. Polymer electrolytes may be made from such polymers as polyethylene oxide (PEO), polyether based polymers and other polymers, which are configured as gels, including polyacrylonitrile (PAN), polymethylmethacrylate (PMMA) and polyvinylidine fluoride (PVDF).

In some embodiments of the batteries provided herein, the electrolyte is a polymer matrix electrolyte. In these PMEs, a solvent is integrated with the polymer and a lithium salt in a homogeneous and substantially optically clear matrix. As a result the PMEs are substantially free of non-absorbed solvent or identifiable pores. Unlike conventional gel polymers where the polymer only provides mechanical support, the polymer, salt and solvent that make up the PME all participate in ionic conduction. Suitable PMEs for use in the batteries provided herein are described in pending U.S. patent application Ser. Nos. 10/437,778; 10/437,559; and 10/437,546, all filed May 13, 2003 to Wensley et al. In one exemplary embodiment, the PME includes a polyimide, at least one lithium salt in a concentration of at least 0.5 moles of lithium per mole of imide ring provided by the polyimide and at least one solvent, all intermixed. The PME is generally homogeneous as evidenced by its high level of optical clarity. As used herein, when the PME is referred to as being substantially optically clear. The phrase "substantially optically clear" regarding the PME refers to the PME being at least 90% clear (transmissive), preferably at least 95%, and most preferably being at least 99% clear as measured by a standard turbidity measurement, transmitting through a normalized 1 mil film using 540 nm light.

The lithium salt is desirably present in an amount between 0.5 and 2.0 moles Li per mole of imide ring provided by the polyimide, or 1.2 and 2.0 moles Li per mole of imide ring provided by the polyimide. Preferred lithium salts for use with PMEs include LiCl, LiBr, LiI, LiBOB, LiClO$_4$, LiBF$_4$, LiAsF$_6$, LiPF$_6$, LiTFSi, LiCF$_3$SO$_3$, and LiN(CF$_3$SO$_3$)$_2$.

A repeat unit weight per imide ring of the polyimide may be no more than 350, no more than 300, or no more than 250. The polyimide is preferably soluble at 25° C. in at least one solvent selected from the group consisting of N-methyl pyrrolidinone (NMP), dimethylacetamide (DMAc) and dimethylformamide (DMF).

The ionic conductivity of the PME at 25° C. is desirably at least $1 \times 10^{-4}$ S/cm, and preferably at least $3 \times 10^{-4}$ S/cm. The PME desirably provides at least one infrared absorption between about 1630 and 1690 cm$^{-1}$, even though neither the salt nor the polyimide provide any absorption peaks in this range. Solvent can be included in the PME to improve conductivity and other properties. For example, solvent content of the PME can be about 15 wt. % to about 40 wt. % for applications wherein high discharge rates or lower temperatures are needed. Solvent content of about 10 wt. % or less can be used for other applications. For polyimide systems, it can be difficult to remove all solvent.

The cathodes used to construct the batteries may be any cathode material suitable for use with lithium metal batteries, many of which are known. For example, the cathode may comprise a polymer binder, an intercalation material, and an electrochemically active material. The electrochemically active material is desirably a metal oxide, such as MnO$_2$ or a lithium metal oxide, such as a lithium vanadium oxide (Li$_x$V$_y$O$_z$), a lithium transition metal oxide (e.g. LiMn$_2$O$_4$), LiCoO$_2$, LiNiO$_2$, Li$_4$Ti$_5$O$_{12}$, LiV$_x$O$_y$, a metal sulfide (e.g. TiS$_2$) and LiFePO$_4$. The polymer binder may be a polyimide, including those described in U.S. Pat. Nos. 5,888,672 and 6,451,480, or even a conductive polyimide, such as those described in pending U.S. patent application Ser. Nos. 10/437,778; 10/437,559; and 10/437,546, all filed May 13, 2003 to Wensley et al. When the anode and the electrolyte and/or the cathode each include a polyimide, they may all include the same or different polyimides. Suitable intercalation materials include, but are not limited to, carbon black and graphite.

In one embodiment, the cathode comprises a cathode current collector having an electrode layer disposed thereon, wherein the electrode layer includes an amorphous, thermoplastic polyimide, an electronic conductive filler and a metal oxide. Cathodes of this type are described in U.S. Pat. No. 5,888,672.

One procedure for producing the cathode is as follows: a slurry of an electrochemically active material, a polymer binder and an intercalation material in a solvent is formed.

The slurry is then coated or printed onto a cathode current collector, such as a aluminum or nickel foil, and the solvent is allowed to evaporate.

VIII. Battery Fabrication

Fabrication of batteries using the lithium powder based electrodes can be carried out with known methods as well with methods as described herein. One or more batteries can be fabricated quickly and efficiently using printing technologies wherein a lithium metal powder based anode, a polymer electrolyte and a cathode are all printed using screen printing or other printing techniques.

The lithium powder based inks provided herein make it possible to fabricate a battery in which all three components are printed. For example, a printed lithium battery may be produced by printing a slurry of an electrochemically active material, such as a lithium metal oxide, a polymer binder, such as a polyimide and an intercalation material, such as graphite in an appropriate solvent onto a metal foil or mesh current collector and allowed to dry to provide a cathode. A polymer electrolyte may then be printed over the printed cathode by printing a solution of a polymer binder, such as a polyimide, a lithium salt and an appropriate solvent onto the cathode. The electrolyte is allowed to dry to remove solvent with an effective amount of solvent retained for conductivity purposes, such as, for example, 5 to 50 weight % versus polyimide plus salt. At this point the overcoated cathode has become both the cathode and the membrane separator. The anode may be either printed directly onto the printed polymer electrolyte or onto a metal current collector, which is then placed over the printed polymer electrolyte. PMEs are well-suited for use in printed lithium batteries because, unlike conventional polymer electrolytes, they do not include free solvents or gel which might interfere with the printing process or the quality of the final printed layers.

Of course, it is not necessary that the anode, cathode and electrolyte be printed. One or more these components may be cast or otherwise processed. In one exemplary fabrication process a separator is cast from a solution as a free-standing film. The separator is then sandwiched between a cathode, which may be printed or cast onto a current collector, and an anode, which may be printed or cast onto a current collector. The layers are then laminated together under heat and pressure. If the cell is based on a polymer electrolyte, the separator also serves as the electrolyte. If the cell is based on a liquid electrolyte, the liquid electrolyte is introduced into the system to provide electrochemical communication between the anode and cathode.

Figure 4:
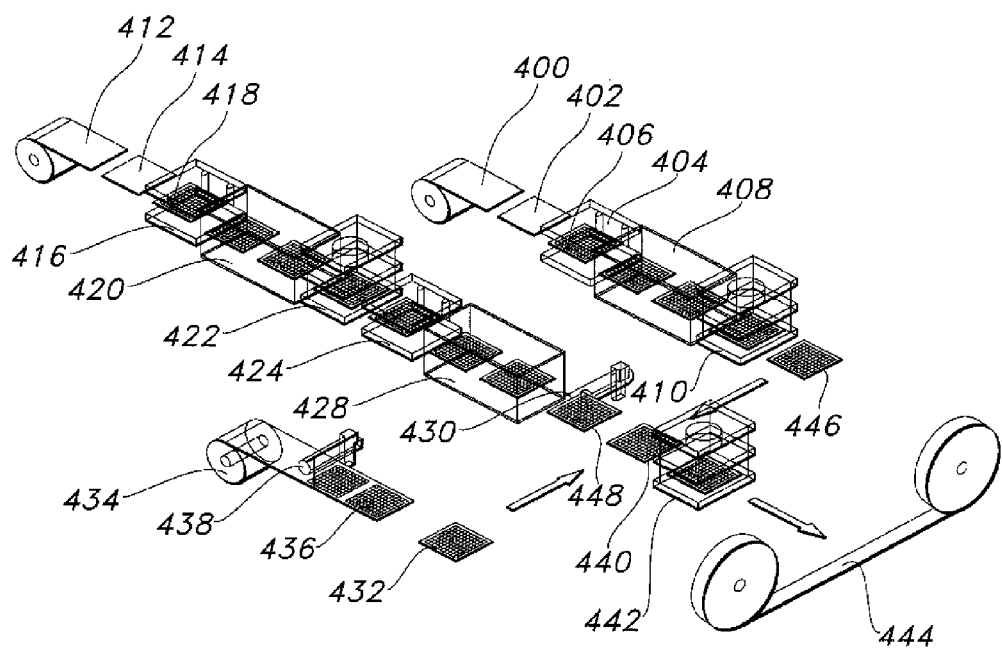
FIG. 4 illustrates an example of a fabrication scheme.
Figure 5:
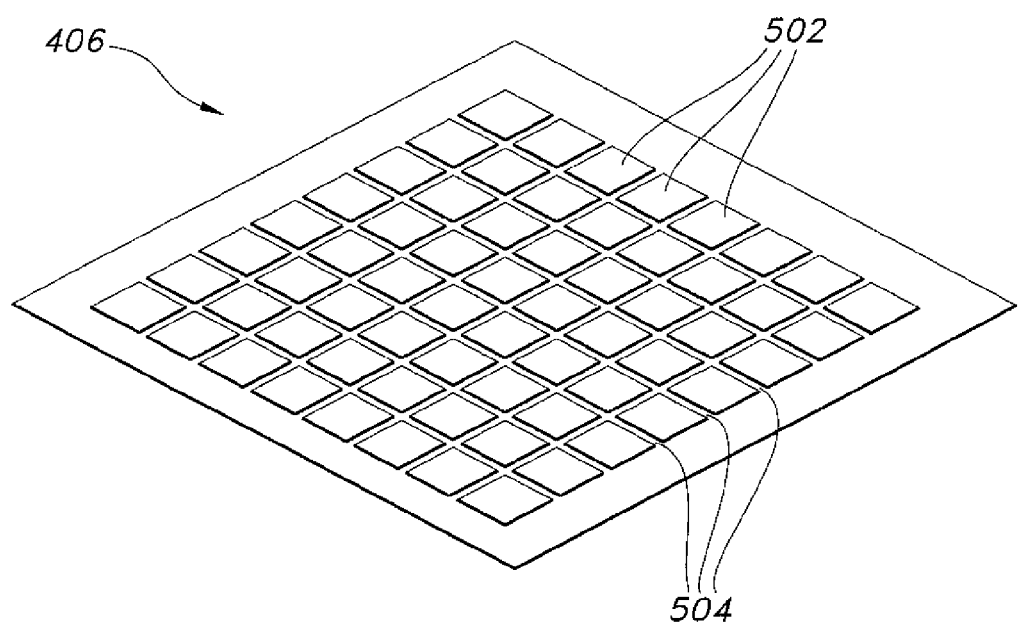
FIG. 5 illustrates an example of a patterned, printed layout.

The battery can be a packaged battery, wherein the metal current collectors form a packaging material surrounding the battery. In this embodiment, the current collectors serve as moisture barriers, current collectors and exterior electrical connection means. FIG. 4 shows how a printed packaged lithium powder based battery can be fabricated. As shown in the figure, a roll of metal foil 400, such as a copper foil, may be cut into individual anode current collector sheets 402 which are passed into a silk screen press 404. In the press, a lithium powder based ink is screen printed onto one side of the metal foil sheet to form an array of anodes 406. FIG. 5 shows an enlarged view of the printed sheet 406, having an array of anodes 502 printed thereon. As shown in the figure, each anode is surrounded by a perimeter area of current collector 504 where there is no printed anode material. The printed sheet is then passed into a drying tunnel 408, which may be an oven, to promote drying of the ink. Fast drying facilitates fast production and is desired generally. The sheet is then fed into a calendaring press 410.

The cathode and electrolyte can be formed by a similar process. First a roll of metal foil 412, such as an aluminum foil, is cut into individual cathode current collector sheets 414 which are passed into a silk screen press 416. In the press, a slurry of a polymer binder, an intercalation material and an electrochemically active material is screen printed onto one side of the metal foil sheet to form an array of cathodes 418. The printed cathode sheet is then passed into a drying tunnel 420 and then into a calendaring press 422. The cathode sheet is then fed into another silk screen press 424 where an array of electrolytes 426 is printed directly over the array of cathodes 418. In the case where the electrolyte is a PME, a slurry of an appropriate polyimide binder, a lithium salt and a solvent may be used as the printing ink. The printed sheet is then passed through another drying tunnel 428. Upon exiting the drying tunnel, the printed sheet may be passed through a spray station 430 where it is sprayed with a small amount of solvent to promote adhesion to a sealant frame layer 432. The sealant frame serves to bond the anode layer and the cathode/electrolyte layers around the perimeter of each cell. The frame is formed from a roll of polymeric film 434, such as a polyester film, having a heat sealable adhesive applied both sides. The film 434 is cut into individual sheets and an array of "windows" 436 is cut into each sheet. This may be accomplished, for example, using a laser cutter 438 or a window punch. The polymeric sheet is then sandwiched between the printed side of the anode sheet 446 and the printed side of the cathode/electrolyte sheet 448 with its array of windows lined up with the anode, cathode and electrolyte arrays. This stacked structure 440 is then laminated in a lamination press 442. In the resulting structure, the polymeric sheet seals to both current collector foils in a perimeter area around the individual cells where there is no printed electrode or electrolyte materials. The stacked, laminated structure may then be subjected to a punching process to singulate the individual battery cells. The cells may then be sent on to a testing station and, finally, to a packaging station, such as a tape and reel packaging station 444.

Figure 6:
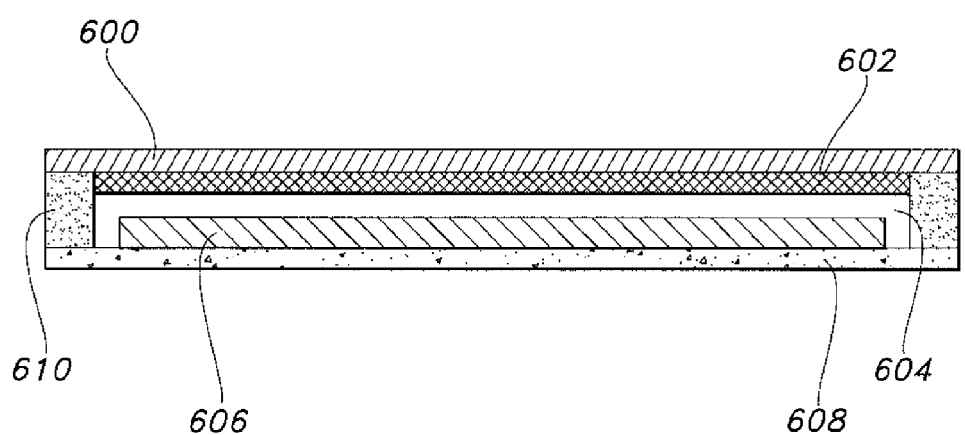
FIG. 6 illustrates an example of a battery configuration.

FIG. 6 shows a battery which, if desired, can be made in accordance with the process outlined in FIG. 4. The battery includes a copper anode current collector 600, a printed lithium metal powder based anode 602, a printed PME 604, a printed cathode 606 and an aluminum cathode current collector 608. The anode and cathode current collectors 600, 608 are sealed around the perimeter of the battery with a polyester sealant frame 610.

IX. Battery Applications

The lithium metal batteries provided herein may be used to power electronic devices that use ultrathin, flexible batteries. Although these devices have proven useful in a broad range of applications, their penetration into some markets has been stalled by size and cost considerations. Frequently, it is the size and cost of production of the battery that powers these devices that prove to be the limiting factors. As discussed above, the lithium powder based inks provided herein, allow for the high speed, high volume production of printed lithium powder anodes and lithium metal batteries. The batteries so produced have the potential to be thinner and less costly to produce than lithium metal batteries made by more conventional techniques.

Examples of applications that may be powered by the present batteries include, but are not limited to, sensors, medical applications, military applications, security applications, music, audio and broadcast applications, computing applications, financial transaction applications, transportation applications and measuring and metering applications. Specific examples of sensors include tracking and identification sensors (e.g., Smart Cards, radiofrequency identification (RFID) tags, biometric sensors and friend or foe identification detectors). These sensors are useful in homeland security applications where they may be used to track and/or identify baggage and passengers and to authenticate documents such as passports and visas. Other sensor devices include emergency, security and environment sensors (e.g., fire alarms, smoke detectors, motion detectors, chemical sensors, temperature sensors, time-temperature indicators, humidity sensors and acoustic seismic sensors). These sensors may take the form of microelectromechanical sensors (i.e., "Smart Dust" sensors). Specific examples of medical devices include external wearable medical devices (e.g., ambulatory infusion pumps), telemetry systems, blood analyzers, bone growth stimulators, Holter monitors, pulse oximeters, external pacemakers and defibrillators. Specific examples of military devices include communications devices (e.g., wireless transmitters), thermal imaging devices, night vision devices, surveillance devices, undersea mines, military radios, guidance and positioning system, search and rescue transponders, radar jammers, respiratory protection suits and sonobuoys. Music, audio and broadcast devices include wireless microphones, transmitters and amplifiers. Specific examples of computing devices include computer clocks and memory backup devices. Specific examples of financial transaction applications include both secure transaction devices (e.g., Smart credit and debit cards) and non-secure transaction devices (e.g., gift and loyalty cards). It should be understood that this list of possible applications is not intended to be exhaustive.

An RFID label includes identification data carried on a silicon chip. An antenna is provided to transmit a radiofrequency signal that can be detected at a distance. Using this antenna the chip receives and transmits data. A "smart" RFID label is one which can track, process and store data. The lithium metal batteries provided herein may be used to power the radiofrequency transmitter of the smart active labels to increase their data transmission rate and data transmission range.

Time Temperature Indicators (TTIs) are a type of RFID label that may be powered by the lithium metal batteries provided herein. TTIs are labels, typically self adhesive labels, that are affixed to or incorporated into food packaging to monitor the temperature history of the food on its way to the customer. These labels are used to help identify spoiled foods and remove them from the chain of distribution. The RFID TTIs may be used to track and store the full temperature history of the food and to provide a signal to indicate the "freshness condition" of the food based on its temperature history.

Smart Cards are cards, typically about the size of a credit card, that contain electronics, such as integrated circuits, for retrieving, processing, transmitting and storing information. A Smart Card includes at least one plastic layer, a battery and at least one electronic device (i.e. electronic circuit) embedded in the plastic layer. The lithium metal batteries provided herein may be used to power the electronic device of a Smart Card to allow for the storage of greater amounts of data and improved processing capabilities.

The thin, flexible and light-weight nature of the lithium metal batteries provided herein also makes them well suited for powering wearable medical devices, including external defibrillators, wearable infusion pumps, patient monitors and electrical stimulation devices.

EXAMPLES

The present invention is further illustrated by the following non-limiting examples. These examples are provided for illustration only and are not to be construed as limiting the scope or content of the invention in any way.

Example 1: Lithium Metal Powder Ink

A quantity of 26.5 grams of the polyimide shown in FIG. 1 is dissolved in enough GBL to produce a solution containing 20 weight percent of the polyimide. A more general description of the polyimide is provided in U.S. Pat. No. 4,629,777. A quantity of 17.8 grams of LiTFSi salt is dissolved in enough GBL to produce a solution containing 20 weight percent of the salt. Equal masses of the two resulting solutions are then mixed and 178 grams of the mixture is added to a suspension of 37.9 grams of lithium powder and 26.5 grams of carbon powder in 574 grams of GBL. The final mixture is shaken well to ensure complete particle wetting by the solvent thus creating a uniform slurry.

The experiment can be repeated with the polymers shown in FIGS. 2 and 3 as desired.

Example 2: Lithium Metal Powder Based Anode

A lithium metal powder based anode is produced in a dry atmosphere as follows. A 3"×5" piece of copper foil is mounted below the silk-screen press of a silk-screen printer. The silk-screen press is then lowered onto the copper foil and the slurry of Example 1 is applied over the screen. A flat edge is dragged over the screen to transfer the slurry through the screen and onto the copper foil. The press is opened and the printed foil is removed. It takes about 30 seconds to mount the foil, lower the press, apply the slurry, open the press and remove the film. This equates to about 12 anodes printed per minute. If desired, the printed anodes may be transferred to a convection oven on a conveyor for drying. The coating is desirably allowed to dry until it has a solid-like appearance, although a residual GBL content of about 15 to 20 weight percent remains. The printed anodes are suitable for use as anodes in lithium metal batteries.

All references described herein are incorporated by reference in their entirety.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the following claims.

What is claimed is:

1. An anode comprising:
   (a) an anode current collector; and
   (b) an electrode layer on the anode current collector, the electrode layer comprising an intercalation carbon material, a conductivity enhancing carbon material, a lithium salt and a polymer binder;
   wherein the electrode layer comprises 10-25% by weight of the polymer binder on a dry weight basis; and
   wherein the polymer binder is a polymer selected from the group consisting of polyimides, polyamides, polyphenylene oxides, polyarylates, polyester-imides, polyester-amide-imides, poly(benzoxazoles), polysulfones, polyether sulfones, polysulfonamides, poly(quinoxaline), poly(para-phenylenes), poly(aryl ethers) substituted with a pyridyl group, poly(aryl ether sulfones), polyepoxides and combinations thereof;

wherein the electrode layer has a thickness of 0.1-10 μm; and wherein the electrode layer is a printed layer.

2. The anode of claim 1, wherein the polymer binder is capable of complexing with lithium salts and participating in ionic conduction, and the intercalation carbon material comprises mesocarbon microbeads.

3. The anode of claim 1, wherein the polymer binder comprises a polyimide.

4. The anode of claim 1, wherein the polymer binder comprises a soluble polyimide.

5. The anode of claim 1, wherein the polymer binder has a glass transition temperature of at least 150° C.

6. The anode of claim 1, wherein the intercalation carbon material comprises mesocarbon microbeads.

7. The anode of claim 1, wherein the conductivity enhancing carbon material comprises carbon nanotubes.

8. The anode of claim 1, wherein the lithium salt is selected from the group consisting of LiCl, LiBr, LiI, LiBOB, LiClO$_4$, LiB$_4$, LiAsF$_6$, LiPF$_6$, LiTFSi, LiCF$_3$SO$_3$ and LiN(CF$_3$SO$_3$)$_2$.

9. The anode of claim 1, wherein the polymer binder comprises a polymer selected from the group consisting of polyphenylene oxides, polyarylates, polyester-imides, poly-ester-amide-imides, poly(benzoxazoles), polysulfones, polyether sulfones, polysulfonamides, poly(quinoxaline), poly(para-phenylenes), poly(aryl ethers) substituted with a pyridyl group, poly(aryl ether sulfones), polyepoxides and combinations thereof.

10. The anode of claim 1, wherein the electrode layer has a thickness of 0.1-8 μm.

11. The anode of claim 1, wherein the electrode layer has a thickness of 0.1-2.5 μm.

12. The anode of claim 1, wherein the electrode layer has a thickness of 0.1-2 μm.

13. The anode of claim 1, wherein the intercalation carbon material comprises graphite.

14. The anode of claim 9, wherein the intercalation carbon material comprises graphite.

15. A battery comprising:
(a) the anode of claim 1;
(b) a cathode; and
(c) an electrolyte in electrochemical communication with the cathode and the anode.

16. A device powered by the battery of claim 15, the device selected from the group consisting of sensors, medical devices, military devices, security devices, music, audio and broadcast devices, computing devices, financial transaction devices, transportation devices and measuring and metering devices.

* * * * *